(12) United States Patent
Fiorello

(10) Patent No.: US 6,672,204 B2
(45) Date of Patent: Jan. 6, 2004

(54) MANUALLY OPERABLE GREASE PRESS FOR COOKED GROUND MEAT

(76) Inventor: Mark A. Fiorello, 6356 Renaissance Dr., Rockford, IL (US) 61111

( * ) Notice: Subject to any disclaimer, the term of this patent is extended or adjusted under 35 U.S.C. 154(b) by 0 days.

(21) Appl. No.: 10/442,395

(22) Filed: May 21, 2003

(65) Prior Publication Data

US 2003/0209155 A1 Nov. 13, 2003

Related U.S. Application Data

(63) Continuation-in-part of application No. 10/144,566, filed on May 13, 2002, now abandoned.

(51) Int. Cl.[7] .............................. A23L 1/00; A47J 19/00; A47J 19/06; B30B 9/02; B30B 9/06
(52) U.S. Cl. ............................ 99/495; 99/506; 99/349; 100/110; 100/116; 100/125; 100/132
(58) Field of Search ................... 99/495, 349, 506–508, 99/510–513, 430, 458, 537, 426; 100/110, 116, 213, 266, 234, 464, 470, 125, 132, 127, 248, 910; 210/464, 466, 469, 470, 471, 474, 478; 249/112, 170, 173; 425/128, 195, 293, 385, 409, 412, 511, 472, 520, 452, 318, 338; D7/676, 672

(56) References Cited

U.S. PATENT DOCUMENTS

| | | | |
|---|---|---|---|
| 630,414 A | | 8/1899 | Schwartz |
| 2,106,453 A | | 1/1938 | Ekdahl |
| 3,552,711 A | * | 1/1971 | DeLaney ..................... 249/170 |
| 3,594,854 A | * | 7/1971 | Roedel ....................... 99/430 X |
| 3,837,775 A | * | 9/1974 | Boucher ....................... 425/195 |
| 3,995,544 A | * | 12/1976 | Farley ........................ 100/116 |
| 4,057,874 A | * | 11/1977 | Walker, Jr. ................... 425/318 |
| 4,860,647 A | * | 8/1989 | Kerslake ................. 100/110 X |
| 4,904,009 A | | 2/1990 | Kozlinski |
| 4,958,557 A | * | 9/1990 | Fiala ........................... 99/495 |
| D327,609 S | | 7/1992 | Carlson |
| 5,320,031 A | * | 6/1994 | Whitney ....................... 99/495 |
| D353,303 S | | 12/1994 | Davis |
| 5,419,250 A | | 5/1995 | Ferguson |
| 5,653,881 A | | 8/1997 | Bruss et al. |
| 5,791,237 A | * | 8/1998 | Gibson ........................ 99/510 |
| 5,902,481 A | * | 5/1999 | Schwietert ................ 99/495 X |
| 5,957,038 A | | 9/1999 | Shimazaki |
| 6,105,810 A | | 8/2000 | Daenen et al. |
| 6,126,018 A | | 10/2000 | Cone et al. |
| 6,196,122 B1 | * | 3/2001 | Lai ............................. 99/495 |
| 6,227,104 B1 | * | 5/2001 | Watkins, Jr. ................. 100/110 |
| 6,422,138 B1 | * | 7/2002 | Ballard ....................... 100/110 |

* cited by examiner

Primary Examiner—Timothy F. Simone
(74) Attorney, Agent, or Firm—Keith Frantz (57) ABSTRACT

A press for removing grease from cooked ground meat includes a main body provided with an upwardly opening cavity for receiving the cooked meat and a front spout, and a lid pivotally connected to the body and provided with a center pressing plate sized to fit into the cavity against the meat. The body and lid are further provided with complimentary left and right handles sized to be squeezed together with the user's left and right hands. Excess grease is pressed out of and removed from the meat by simultaneously squeezing the handles together and pouring the grease from the spout.

35 Claims, 5 Drawing Sheets

MANUALLY OPERABLE GREASE PRESS FOR COOKED GROUND MEAT

CROSS-REFERENCES TO RELATED APPLICATIONS

This application is a continuation-in-part application of U.S. patent application Ser. No. 10/144,566, filed May 13, 2002 now abandoned.

Statement regarding federally sponsored research or development—not applicable.

Reference to sequence listing—not applicable.

BACKGROUND OF THE INVENTION

1. Field of Invention

The present invention relates generally to devices for use in removing grease from cooked meat.

More particularly, the invention relates to a manually operable device to press excess grease from cooked ground meat.

2. Description of Prior Art

Non-formed ground meat is typically cooked in a closed-bottom pan or pot, resulting in an accumulation of grease in the pan with the cooked meat. Before consumption or use in further cooking, it is customary to separate the grease from the cooked meat. And for health considerations, it is desirable to remove as much grease as possible.

Grease is typically removed from cooked ground meat by either tipping the pan over a disposal container while holding a lid offset against the top of the pan to prevent loss of the meat, or pouring the cooked meat and grease into a strainer to drain the grease out. However, a certain amount of grease remains in the meat with such procedures. Moreover, such procedures can be dangerous because the person may be required to position his or her hands above the hot meat and grease, and/or to rotate or twist his or her wrists into an awkward position. And the more grease that is desired to be removed, the longer the person must hold his or her hands in such dangerous or awkward positions.

Certain prior devices have attempted to address the first concern with specialized equipment to press excess grease from cooked meat.

For example, Ferguson, U.S. Pat. No. 5,419,250, discloses a Hamburger Degreaser to remove excess grease from cooked hamburgers. This device includes a lower container provided with a cavity to receive grease, a cover that is releasably connected to the container, a draining plate positioned between the container and cover at the top of the cavity, and a pressing plate that is linearly movable toward and away from the draining plate and is spring-biased away from the draining plate. The cooked hamburger is placed on the draining plate, the cover is connected to the lower container, and the pressing plate is manually pressed toward the draining plate to press the excess grease from the hamburger.

However, this device suffers from certain drawbacks and disadvantages. For example, the cover completely encloses the draining plate during use, and must be completely separated from the lower container between each use to insert and remove the cooked meat. The device is relatively complicated, with numerous parts and various sliding fits required, and is therefore relatively expensive. The presence of several distinct parts presents the possibility that one or more parts may be lost, thus rendering the remaining parts of the device inoperable for their intended use. And the device is for use with formed patties only. It is not suitable for use in removing excess grease from a quantity of non-formed ground meat because it lacks side walls or other arrangement to retain a reasonable quantity of the meat on the draining plate.

Other prior devices for removing excess grease from cooked ground meat are also known. However, as with Ferguson, these other devices are generally intended to press grease from formed patties, and are not suitable for use with non-formed ground meat.

Thus, there is a need for a device that addresses the above-identified concerns, disadvantages and drawbacks. In particular, there is a need for an improved device that is suitable for use in removing excess grease from both formed and non-formed cooked ground meat.

BRIEF SUMMARY OF THE INVENTION

The general aim of the invention is to provide a new and improved device for use in removing excess grease from cooked ground meat.

A detailed objective is to provide a cost effective, manually operable grease press of relatively simple construction, that is easy to use, and that promotes safety during use.

Another detailed objective is to provide a press that is quickly and easily opened and closed for ease of loading and removing cooked meat, and that relies on manual pressure developed as the device is closed for removal of excess grease from the cooked meat.

Yet another detailed objective is to provide a manually operable grease press which, while suitable for other uses, is especially useful with a quantity of cooked meat that one person can easily and safely lift and manipulate such as typically used in a home or other small-volume environment.

These and other objectives and advantages of the invention will become more apparent from the following detailed description when taken in conjunction with the accompanying drawings.

In a preferred embodiment, a press according to the invention includes a main body provided with an upwardly opening cavity for receiving the cooked meat and a front spout, and a lid pivotally connected to the body and provided with a center pressing plate sized to fit into the cavity against the top of the cooked meat. The body and lid are further provided with complimentary left and right handles sized to be squeezed together with the user's left and right hands. Excess grease is pressed out of and removed from the meat by simultaneously squeezing the handles together and pouring the grease from the spout.

Accordingly, a preferred embodiment grease press is relatively simple in both construction and use, requires very few parts, and is relatively economical to produce. Provision of the connected body and lid eliminate the potential that one or the other part is misplaced during storage. Provision of the complimentary left and right handles used to press excess grease from the cooked meat requires the user to safely position both hands off to the side of the potentially hot grease as it is poured out of the device.

In one embodiment, the handles are somewhat elongated, to permit the user to grip and squeeze the handles, and simultaneously pour the grease out, by positioning his or her hands with the palms facing down, curling the fingers around the forward side of the handles and the thumbs around the back sides, and rotating the user's wrists downwardly, promoting safe and convenient use of the press.

In an alternate embodiment, the body and lid are separate components, not pivotally connected together.

In a second alternate embodiment, the handles are shorter and wider, sized to be gripped with the user's palms facing each other, with his or her fingers curled under the handles and thumbs over the tops of the handles. Grease is removed from the cooked meat by squeezing the handles together, and rotating the spout to drain the grease from the press.

Reference numerals shown in the drawings correspond to the following:

10—grease press
12—press body
14—press lid
16—hinge
16a—hinge pin
16b—hinge slot
18—cavity in body 12
20—upper rim of body 12
22—closed bottom of cavity 18
24—walls of cavity 18
24a—front wall of cavity 18
26—spout in front wall 24a
28—handles of body 12
30—free ends of handles 28
32—top of lid 14
34—flange of lid 14
36—central press-portion of lid 14
38—walls of press-portion 36
38a—front wall of press-portion 36
40—closed bottom of press-portion 36
42—handles of lid 14
44—free ends of handles 42
46—cooked ground meat
48—bottom of body 12
V—vertical movement of lid 14
110—first alternate embodiment grease press
112—press body of grease press 110
114—press lid of grease press 110
118—cavity in body 112
120—upper rim of body 112
122—closed bottom of cavity 118
124—walls of cavity 118
124a—front wall of cavity 118
126—spout in front wall 124a
128—handles of body 112
130—free ends of handles 128
132—top of lid 114
134—flange of lid 114
136—central press-portion of lid 114
138—walls of press-portion 136
138a—front wall of press-portion 136
140—closed bottom of press-portion 136
142—handles of lid 114
144—free ends of handles 142
148—bottom of body 112
210—second alternate embodiment grease press
212—press body of grease press 210
214—press lid of grease press 210
216—hinge of grease press 210
216a—hinge pin of grease press 210
216b—hinge slot of grease press 210
218—cavity in body 212
220—upper rim of body 212
222—closed bottom of cavity 218
224—walls of cavity 218
224a—front wall of cavity 218
226—spout in front wall 224a
228—handles of body 212
230—free ends of handles 228
232—top of lid 214
234—flange of lid 214
236—central press-portion of lid 214
238—walls of press-portion 236
238a—front wall of press-portion 236
240—closed bottom of press-portion 236
242—handles of lid 214
244—free ends of handles 242
248—bottom of body 212
250—gripping rib on handles 228
252—knob
254—upper cavity in lid 214
256—side and back walls of cavity 254

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

For purposes of illustration, a preferred embodiment in accordance with the invention is shown in the drawings as manually operable grease press 10 (FIGS. 1–9) for use in removing remove excess grease from a quantity of cooked ground meat such as may be typically encountered during home and other small-volume uses.

The press 10 includes a main body 12, a lid 14 and a hinge 16 connecting the lid to body.

The body 12 is provided with a central upwardly opening cavity 18 (see FIGS. 5–9) sized to hold the cooked ground meat. The cavity is established by a closed bottom 22, an upper edge 20, and encircling walls 24 extending therebetween. The cavity shown is established with a non-circular cross-section that tapers slightly outwardly upon progressing upwardly from the bottom. The cavity may alternately be provided with any convenient cross-sectional form as desired for aesthetic or functional purposes in accordance herewith. A fluid-directing, fluid-flow formation spout 26 is provided in the upper portion of the front wall 24a, with fluid flow communication with the cavity for directed discharge of grease from the cavity. The bottom 48 of the body is generally flat, includes a flat rim, or is otherwise configured to maintain the press in an upright position when resting on a horizontal surface such as a countertop.

The lid 14 is provided with a central press-portion 36 sized to be slipped into the cavity 18 with a clearance fit. The height of the lid, i.e., the depth that the lid extends into the cavity, preferably ranges from approximately half the depth of the cavity as shown, to slightly less than the depth of the cavity, to enable pressing excess grease from cooked meat indicated as 46 (FIG. 5B) in the cavity. The press-portion 36 is established by an upper structural formation such as flange surrounding 34, walls 38 extending downwardly from the flange, and a pressing plate 40 connected across the bottom of the walls 38. The pressing plate 40 generally tracks the size and shape of the cavity 18 to establish a relatively small radial clearance with the sidewalls 24 of the cavity. In preferred embodiments, the radial clearance between the pressing plate and the sidewalls of the cavity is approximately 1/16 to 1/8 inch to allow for flow of grease from the cavity when the press is tipped, while preventing loss of cooked meat from when disposing of the grease.

The body 12 and lid 14 are further provided with pairs of complimentary handles 28 and 42, respectively, on the left and right sides thereof. The handles 28 and 42 extend generally horizontally, in opposite (left and right) directions, and terminate in free ends 30 and 44, respectively. The handles are somewhat elongated and relatively thin, and are sized for comfortable gripping and simultaneously squeezing together, by positioning the user's left and right hands over the length of the handles with palms facing down and curling fingers around the front sides of the handles along the length thereof and thumbs around the back sides of the handles. To this end, the handles are preferably between approximately 3 to 6 inches in length and between approximately 1 to 1¼ inches in width (from front to back).

In preferred embodiments, the body 12 and lid 14 are each provided with unitary or solid construction, such as formed via injection molded plastic, or fired ceramic materials.

The hinge 16 pivotally connects the back of the body 12 and back of the lid 14, and the press-portion 36 is configured for swinging into and out of position in the cavity 18 as the lid swings into and out of position above the body. The hinge shown includes hinge pin 16a located in a slot 16b. The slot is formed with a vertical component such that the lid is mounted for vertical movement "V" (see FIGS. 5A and 5B) in relation to the body. For a particular configuration press, the extent of vertical movement will be established by geometric constraints, such as between the diameter of the pin and the length of the hinge slot, between the bottom 22 of the cavity 18 and the pressing plate 40, between the top of body 12 and the lid 14 or hinge connection thereto, or the spacing between the handles. This vertical translation capability is particularly useful in presses sized for acting on thicker layers and a wider range of cooked meat.

For effective manual removal of grease from the cooked meat, the press 10 is preferably sized for acting on a layer of cooked meat of approximately 1 to 3 inches thick (before pressing). The cavity is preferably further sized to be filled to approximately ½ to full depth before pressing. To provide for an installed guiding depth of the pressing plate 40 in the cavity 18 as it presses the meat, the cavity 18 is preferably provided with a depth of at least between approximately 1 to 3 inches. For example, a suitable cavity for use with approximately 1 pound of cooked meat will be provided at approximately 2 inches deep, with a cavity cross-sectional area of between approximately 18 to 24 square inches.

Figure 1:
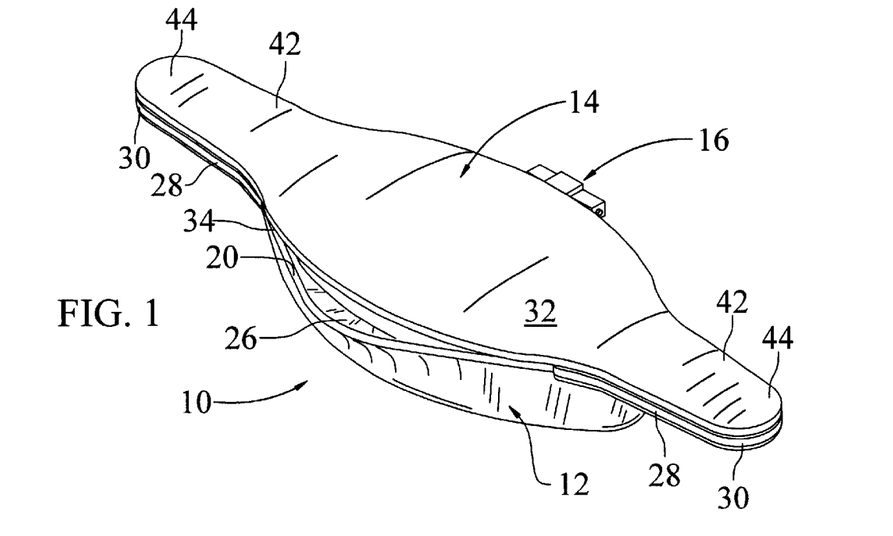
FIG. 1 is a perspective view of a new and improved grease press incorporating the unique aspects of the present invention, the press being shown in the closed position.
Figure 2:
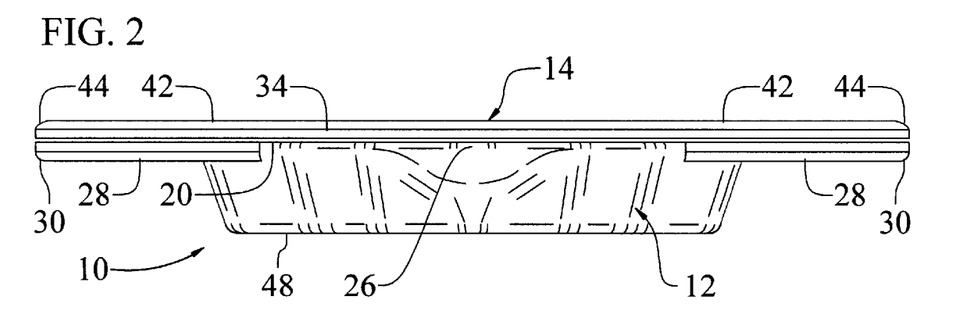
FIGS. 2–4 are front, side and top views thereof.
Figure 3:
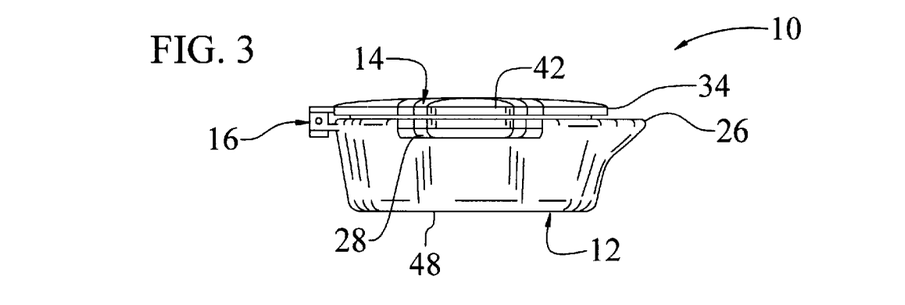
Figure 4:
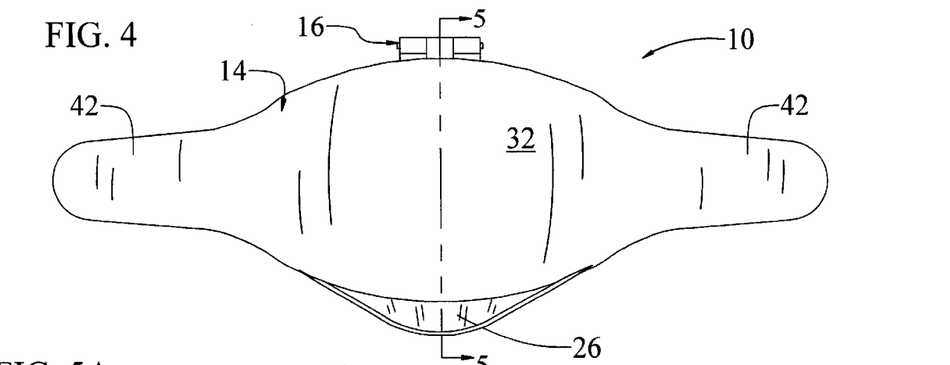
Figures 5A, 5B, 9:
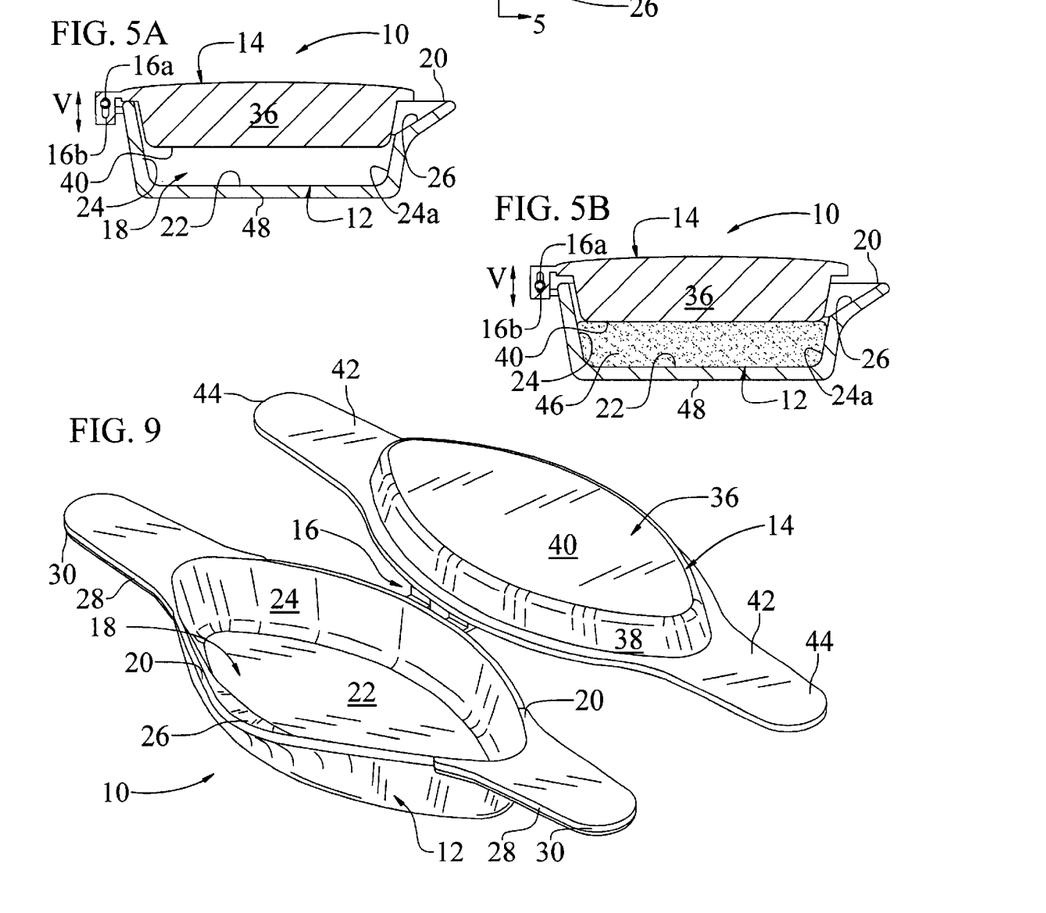
FIG. 5A is a cross-sectional view taken along the line 5—5 of FIG. 4.
FIG. 5B is a view similar to FIG. 5A but showing the grease press loaded with cooked ground meat.
FIG. 9 is a perspective view of the grease press of FIG. 1 in a fully-open position.
Figure 6:
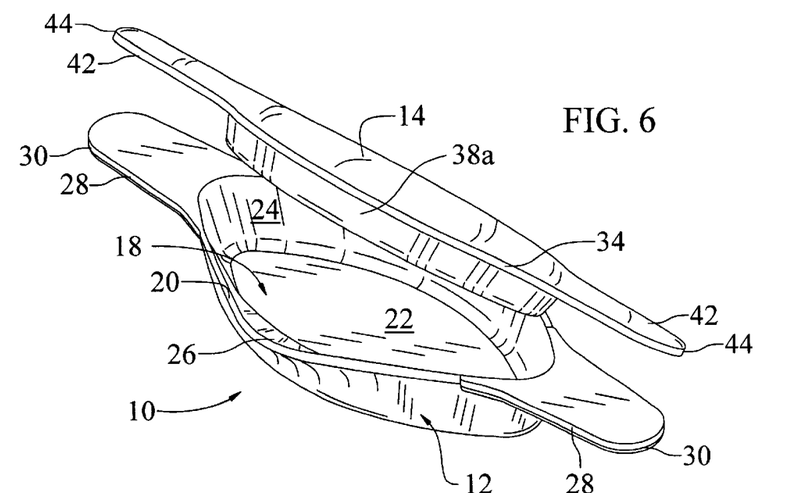
FIGS. 6–8 are a perspective, front and side views, respectively, of the grease press of FIG. 1 shown in a partially open position.
Figure 7:
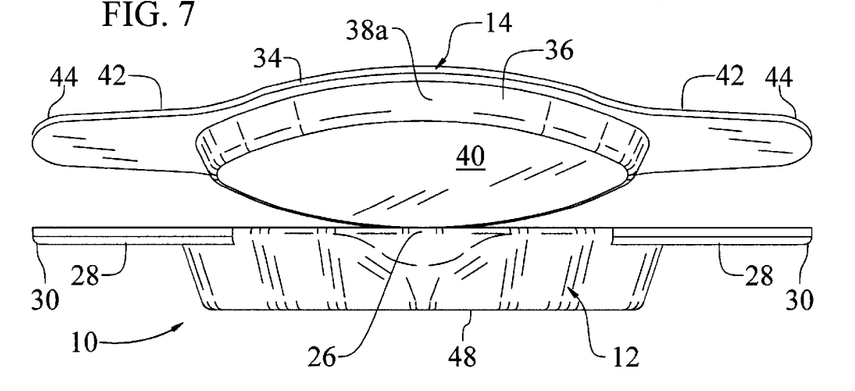
Figure 8:
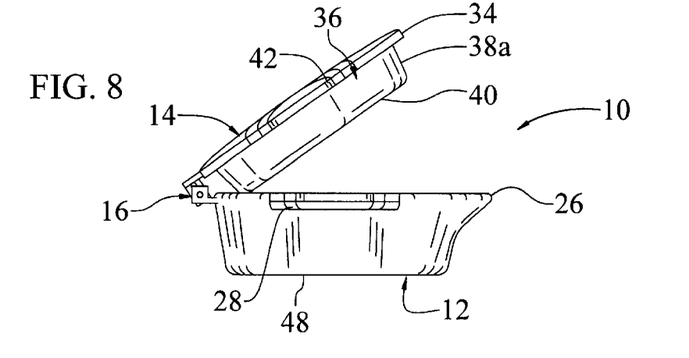
Figure 10:
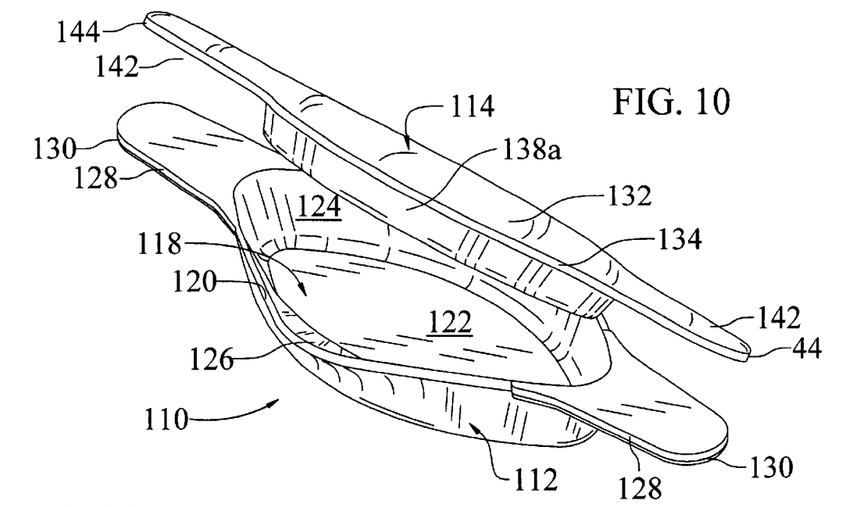
FIGS. 10–13 are views similar to FIGS. 6–8 and 5B, respectively, respectively, of a first alternate embodiment press in accordance with the invention.
Figure 11:
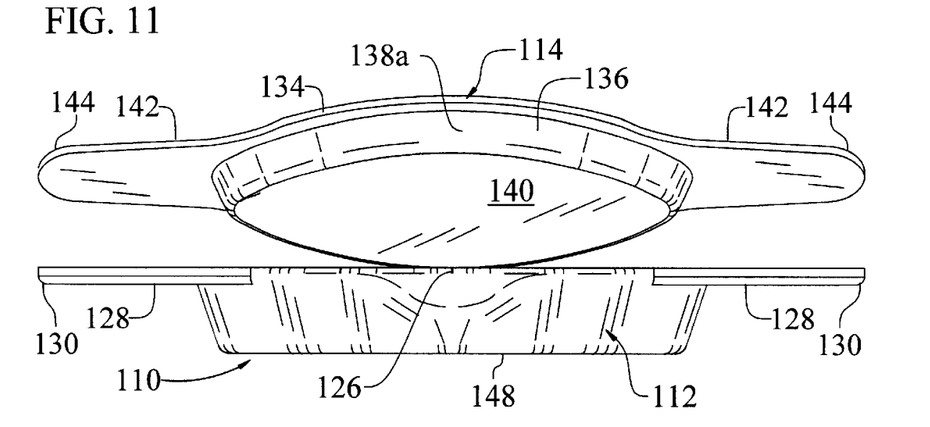
Figure 12:
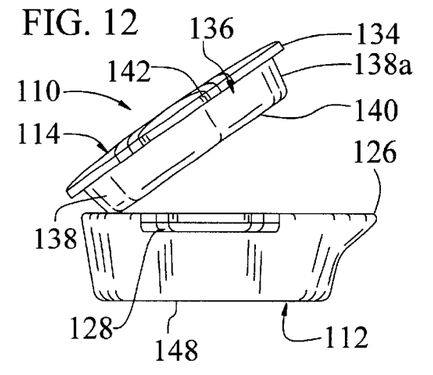
Figure 13:
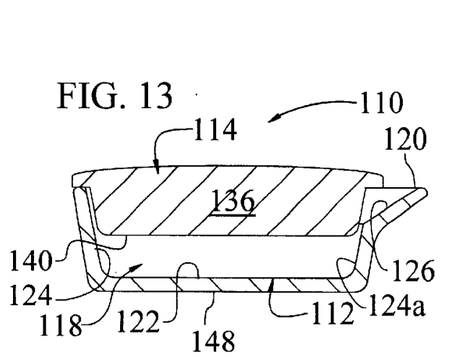

To use the press 10, the lid 14 is initially swung open as shown in FIG. 9 to fully expose the open top of the cavity 18. A quantity of cooked ground meat is spooned or otherwise loaded into the cavity, and the lid is swung closed such that the pressing plate 40 engages the top of the ground meat 46 in the cavity as shown in FIG. 5B. Excess grease is then quickly and easily removed from cooked meat by a user by simply gripping the handles 28, 42 as described above, positioning the front of the press over a grease disposal container, rotating his or her wrists downwardly to tip the press forwardly and permit grease to flow from the cavity out the spout 26, while simultaneously squeezing the handles 28 and 42 together to press the excess grease from the meat.

In view of the foregoing, it will be apparent that alternate embodiment grease presses may be provided in accordance with the invention. For example, in the embodiment shown, the flange 34 generally tracks the size and shape of the upper rim 20, and the cross-sectional size and shape of the center press-portion 36 is closed and tracks the cross-sectional size and shape of the cavity 18. The closed pressing precludes the possibility that cooked meat will find its way into the lid for ease of cleaning. However, the flange of the lid, or outer portion thereof, need not track the upper rim of the cavity, and the pressing-portion of the lid need not be entirely closed by encircling walls as shown in practicing the invention. Alternate embodiments may be provided with alternate configuration flanges and with an open pressing portion provided with appropriate grease draining and associated flow-directing formation. In other alternate embodiments, the fluid-flow formation for directing discharge of grease from the cavity may be provided as one or more drain holes extending through, for example, the front portion of the lid, the upper front wall of the cavity, and/or the front portion of the pressing plate. In still other embodiments, the walls of the cavity and the pressing-portion will be formed straight up and down, for enhanced vertical movement capability of the lid in the body. These and additional alternate embodiments will be readily devised and constructed those skilled in the art.

For purposes of further illustration, a first alternate embodiment press 110 is shown in FIGS. 10–13 in which parts are identified with reference numerals corresponding the reference numerals of the same or equivalent parts of press 10 but incremented by 100. In this instance, the lid 114 and body 112 are not pivotally connected together. The non-circular cross-sectional form of the cavity 118 and pressing-portion 136 assist in orienting the pressing-portion 136 into the cavity and in aligning the handles 128 and 142 of the lid and body, respectively, when the lid is positioned on the body for removal of the excess grease from cooked meat. Otherwise, the press 110 includes similar parts, and operates and is used in the same manner as press 10. Thus, the body 112 includes a base 148, an upper rim 120, and the cavity 118 includes a closed bottom 122, surrounding sidewalls 124 with a front wall 124a, with a spout 126 formed in the front wall 124a. The handles 128 include free ends 130, and the of handles 142 include free ends 144. The lid includes a top 132, a flange 134, a central press-portion 136 with walls 138 including a front wall 138a and a closed bottom pressing plate 140.

Figure 14:
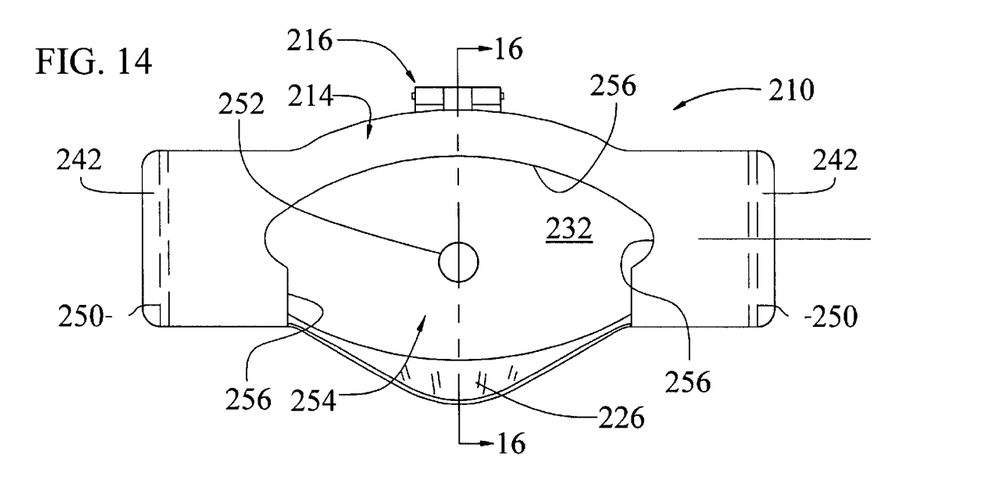
FIGS. 14 and 15 are top and front views of a second alternate embodiment press, shown in the closed position.
Figure 15:
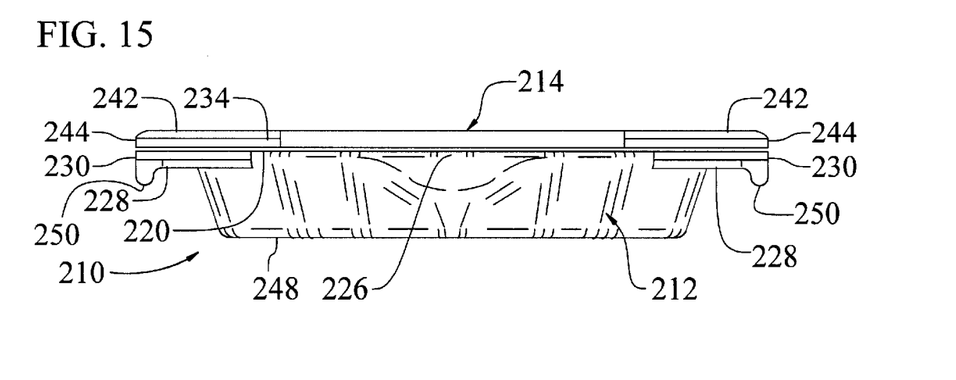
Figure 16:
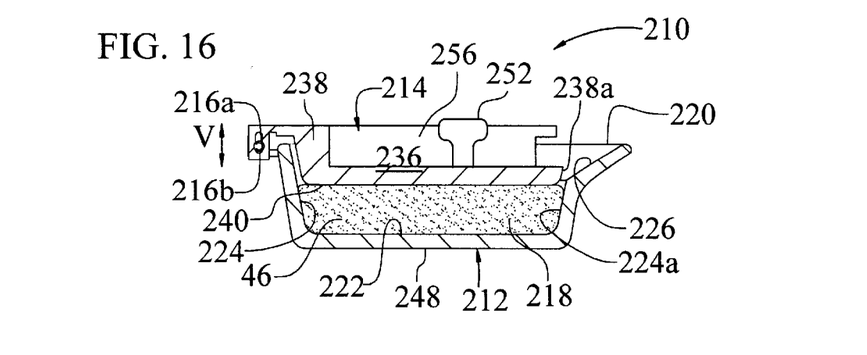
FIG. 16 is a cross-sectional view taken along the line 16—16 of FIG. 14.

A second alternate embodiment press 210 is shown in FIGS. 14–16 in which parts are identified with reference numerals corresponding the reference numerals of the same or equivalent parts of press 10 but incremented by 200. As with presses 10 and 110, the press 210 includes a body 212, a lid 214, and a hinge 216 connecting the lid to the body. The body is provided with a flat bottom, 248, a cavity 218 established by a closed bottom 222, an upper rim 220 and encircling sidewalls 214, and handles 228 with free ends 230. A spout formed in the front wall 224a communicates with the cavity for discharge of grease therefrom. The lid includes a top 232, a central pressing portion 236 provided with walls 238 including a front wall 238a and a bottom pressing plate 240, a flange 234, and handles 242 with free ends 244.

The central press-portion 236 is formed with an upper cavity 254 to establish a light weight lid 214. The upper cavity is defined by side and back walls 256, with the front of the cavity open as shown in FIG. 16. A knob 252 is connected to the center of the top surface 232 for ease of opening the lid from the cavity 218 in the body 212.

The handles 228 and 242 of the press 210 are shorter and wider than the handles of presses 10 and 110, and are sized to be gripped with the user's palms facing each other and the free ends of the handles, with his or her fingers curled under the ends of the handles and thumbs positioned over the tops of the handles. In particular, the handles between approximately 1 to 3 inches in length; and between approximately 2 to 3 inches in width (from front to back). In preferred embodiments, one or more gripping ribs or other grip aid or frictionalized surfaces are provided on the underside of the body handles and/or on the top side of the lid handles to aid in maintaining the tips of the user's fingers and thumbs in position on the handles. In the embodiment shown, a single gripping rib 250 extends laterally across the underside of the free end 230 of the body handles. This configuration gripping rib aids in maintaining the tips of the user's fingers in position against the lower side of the body handles between the rib and the outer profile of the body. The handles are shown solid, but may be alternately provided as generally U-shaped handles extending outwardly from the body and lid.

With this arrangement, grease is removed from cooked meat placed in the cavity 218 by positioning the user's hands as described above, squeezing the handles together, and rotating the spout downwardly to pour the grease from the press.

From the foregoing, it will also be apparent that the present invention brings to the art a new and improved manually operable press device which, among other things, is uniquely adapted for safe removal of excess grease from cooked ground meat, is relatively simple in both construction and use, is adapted to provide even pressure on the cooked meat for removal of grease via sets of opposite handles, and permits draining of excess grease without requiring awkward positioning or twisting of the user's hands and wrists.

I claim:

1. A manually operable grease press for removal of excess grease from cooked ground meat, the press comprising
   a) a body having
      (1) a front, a back, and left and right sides,
      (2) a central upwardly opening cavity established with encircling walls and a closed bottom to receive and hold a quantity of cooked meat,
      (3) a pair of handles extending to the left and right from associated sides of the body, the handles having front and back sides and being sized to grip in left and right hands, respectively, with palms aligned along the length of the handles, by curling fingers around front sides of the handles and thumbs around the back sides, and
      (4) a base to support the cavity in an upright position when resting on a horizontal surface;
   b) a lid having
      (1) a front, a back, and left and right sides,
      (2) a central pressing plate removably positionable in said cavity proximate the closed bottom of said cavity for pressing grease from a quantity of cooked meat in the cavity, the pressing plate generally tracking the size and shape of said cavity, and
      (3) a pair of handles extending to the left and right from associated sides of the lid above and proximate said pair of handles of the body, said pairs of handles being sized for simultaneously gripping and squeezing together to remove grease from cooked meat when positioned in the cavity between said closed bottom and said pressing plate; and
   c) a front fluid-flow formation communicating with the cavity for directed discharge of grease therefrom.

2. The press as defined in claim 1 in which the handles of said pairs of handles are between approximately 3 to 6 inches long.

3. The press as defined in claim 1 in which said cavity is between approximately 1 to 3 inches deep.

4. The press as defined in claim 1 in which said pressing plate tracks the size and shape of said closed bottom with a small radial clearance therebetween.

5. The press as defined in claim 1 further comprising a hinge connecting the back of the lid and the back of the body for swinging of said pressing plate into and out of said cavity.

6. The press as defined in claim 5 in which said hinge is adapted for both swinging and vertical translation of the lid.

7. The press as defined in claim 1 in which said fluid-flow formation includes a spout defined in the encircling walls of said body.

8. The press as defined in claim 7 in which the lid and the body are of unitary construction.

9. A manually operable grease press for removal of grease from cooked ground meat, the press comprising
   a) a body having
      (1) an encircling upper rim including front, back, left and right sides,
      (2) an upwardly opening cavity established with a closed bottom and encircling walls extending between said upper rim and said closed bottom to receive and hold a quantity of cooked meat, and
      (3) a pair of handles extending to the left and right from associated sides of said rim, the handles having front and back sides and being sized to grip in left and right hands, respectively, with palms aligned along the length of the handles, by curling fingers around front sides of the handles and thumbs around the back sides; and
   b) a lid having
      (1) a flange including front, back, left and right sides, the back side of said flange being pivotally connected to the back side of said upper rim for swinging of the lid into and out of position above the body,
      (2) a pressing plate connected to one of the sides of said flange for swinging therewith, the pressing plate being sized for positioning into and out of said cavity as the lid swings into and out of position above the body, the pressing plate generally tracking the size and shape of said cavity and configured to permit the outflow of grease from therebelow, and (3) a pair of handles extending to the left and right from associated sides of said flange above and proximate said pair of handles of the body, said pairs of handles being sized for simultaneously gripping and squeezing together to remove grease from cooked meat when positioned in the cavity between said closed bottom and said pressing plate.

10. The press as defined in claim 9 in which the handles of said pairs are between approximately 3 to 6 inches long.

11. The press as defined in claim 9 in which said cavity is between approximately 1 to 3 inches deep.

12. The press as defined in claim 9 in which said pressing plate tracks the size and shape of said closed bottom with a small radial clearance therebetween.

13. The press as defined in claim 9 further comprising a hinge pivotally connecting said body and said lid for said swinging of said lid, the hinge being further adapted for vertical translation of the lid.

14. The press as defined in claim 9 further comprising a front fluid-flow formation communicating with the cavity for directed discharge of grease therefrom.

15. The press as defined in claim 14 in which said fluid-flow formation includes a spout defined in the rim of said body.

16. The press as defined in claim 15 in which the lid and the body are of unitary construction.

17. A manually operable grease press for removal of grease from cooked ground meat, the press comprising
a) a body having
(1) an upper rim including front, back, left and right sides,
(2) a central upwardly opening cavity having a closed bottom and encircling sidewalls extending between approximately 1 to 3 inches deep to receive and hold a quantity of cooked meat,
(3) a pair of handles extending to the left and right for a distance of between approximately 3 to 6 inches from associated sides of said cavity, the handles having front and back sides and being sized to grip in left and right hands, respectively, with palms aligned along the length of the handles, by curling fingers around front sides of the handles and thumbs around the back sides, and
(4) a base to support the cavity in an upright position when resting on a horizontal surface;
b) a lid having
(1) a flange including front, back, left and right sides,
(2) a pressing plate connected to one of said sides of the flange, the pressing plate being positionable proximate the closed bottom of said cavity for pressing grease from a quantity of meat in the cavity, the pressing plate generally tracking the size and shape of said cavity, and
(3) a pair of handles extending to the left and right for a distance of between approximately 3 to 6 inches from associated sides of said flange above and proximate said pair of handles of the body, said pairs of handles being sized for simultaneously gripping and squeezing together to remove grease from cooked meat when positioned in the cavity between said closed bottom and said pressing plate;
c) a front fluid-flow formation connected to one of said lid and said body and communicating with the cavity for directed discharge of grease therefrom; and d) a hinge connecting the back of the body and the back of the lid for swinging of the lid into and out of position above the body and swinging of the pressing plate into and out of said position proximate the closed bottom of said cavity.

18. The press as defined in claim 17 in which said hinge is adapted for both swinging and vertical translation of the lid.

19. The press as defined in claim 17 in which said fluid-flow formation includes a spout defined in one of said encircling walls and said rim of the body.

20. The press as defined in claim 19 in which the lid and the body are of unitary construction.

21. A manually operable grease press for removal of grease from cooked ground meat, the press comprising
a) a body having
(1) a front, a back, and left and right sides,
(2) a central upwardly opening cavity established with encircling walls and a closed bottom to receive and hold a quantity of cooked meat, and
(3) a pair of handles extending to the left and right from associated sides of the body, the handles having front and back sides and free ends, the handles being sized to grip in left and right hands, respectively;
b) a lid having
(1) a back, and left and right sides,
(2) a central pressing plate removably positionable in said cavity proximate the closed bottom of said cavity for pressing grease from a quantity of cooked meat in the cavity, the pressing plate generally tracking the size and shape of said cavity, and
(3) a pair of handles extending to the left and right from associated sides of the lid above and proximate said pair of handles of the body, said pairs of handles being sized for simultaneously gripping and squeezing together to remove grease from cooked meat when positioned in the cavity between said closed bottom and said pressing plate; and
c) a front fluid-flow formation communicating with the cavity for directed discharge of grease therefrom.

22. The press as defined in claim 21 in which the body further includes a base to support the cavity in an upright position when resting on a horizontal surface.

23. The press as defined in claim 21 in which the body and lid are pivotally connected together for swinging of the lid into and out of position over the body and swinging of the pressing plate into and out of said position proximate the closed bottom of the cavity.

24. The press as defined in claim 23 in which the body and lid are further connected for vertical movement of the lid in relation to the body.

25. The press as defined in claim 21 in which the handles of the body are formed with underside surfaces.

26. The press as defined in claim 25 in which the underside surfaces of the body handles are further formed with gripping ribs.

27. The press as defined in claim 21 in which the cavity is between approximately 1 to 3 inches deep, and said pressing plate extends between approximately ½ to ¾ depth into said cavity.

28. The press as defined in claim 21 in which the pairs of handles are sized for simultaneous gripping with the user's palms aligned along the length of the handles, by curling fingers around front sides of the handles and thumbs around the back sides of the handles.

29. The press as defined in claim 28 in which the handles of said pairs are between approximately 3 to 6 inches long, and between approximately 1 to 1½ inches wide.

30. The press as defined in claim 21 in which the pairs of handles are sized for simultaneous gripping with the user's palms facing each other and the free ends of the handles, with fingers curled under the handles and thumbs positioned over the tops of the handles.

31. The press as defined in claim 28 in which the handles of said pairs are between approximately 1 to 3 inches long, and between approximately 2 to 3 inches wide.

32. The press as defined in claim 21 in which said fluid-flow formation includes a spout defined in the front side of said body.

33. A manually operable grease press for removal of grease from cooked ground meat, the press comprising
   a) a body having
      (1) an upper rim including front, back, left and right sides,
      (2) a central upwardly opening cavity having a closed bottom and encircling sidewalls to receive and hold a quantity of cooked meat,
      (3) a pair of handles extending to the left and right for a distance of between approximately 2 to 3 inches from associated sides of said cavity, the handles having front and back sides and being sized to grip in left and right hands, respectively, with the user's palms facing each other and the free ends of the handles, by curling his or her fingers under the ends of the handles and positioning the thumbs over the tops of the handles, and
      (4) a base to support the cavity in an upright position when resting on a horizontal surface;
   b) a lid having
      (1) a flange including a back, and left and right sides,
      (2) a pressing plate connected to one of said sides of the flange, the pressing plate being positionable proximate the closed bottom of said cavity for pressing grease from a quantity of meat in the cavity, the pressing plate generally tracking the size and shape of said cavity, and
      (3) a pair of handles extending to the left and right for a distance of between approximately 2 to 3 inches from associated sides of said flange above and proximate said pair of handles of the body, said pairs of handles being sized for simultaneously gripping and squeezing together to remove grease from cooked meat when positioned in the cavity between said closed bottom and said pressing plate;
   c) a front fluid-flow formation connected to one of said lid and said body and communicating with the cavity for directed discharge of grease therefrom; and
   d) a hinge connecting the back of the body and the back of the lid for swinging of the lid into and out of position above the body and swinging of the pressing plate into and out of said position proximate the closed bottom of said cavity.

34. The press as defined in claim 33 in which the hinge is adapted for both swinging and vertical translation of the lid.

35. The press as defined in claim 33 in which the width of the handles is between approximately 2 to 3 inches wide from front to back.

* * * * *